Oct. 18, 1927.
J. J. LE DUC
1,645,761
EXPANSIBLE FLUID MOTOR
Filed Aug. 16, 1924
5 Sheets-Sheet 2
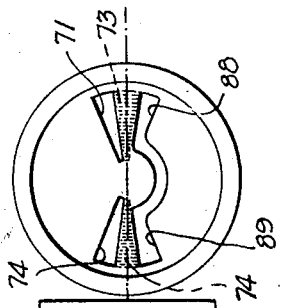
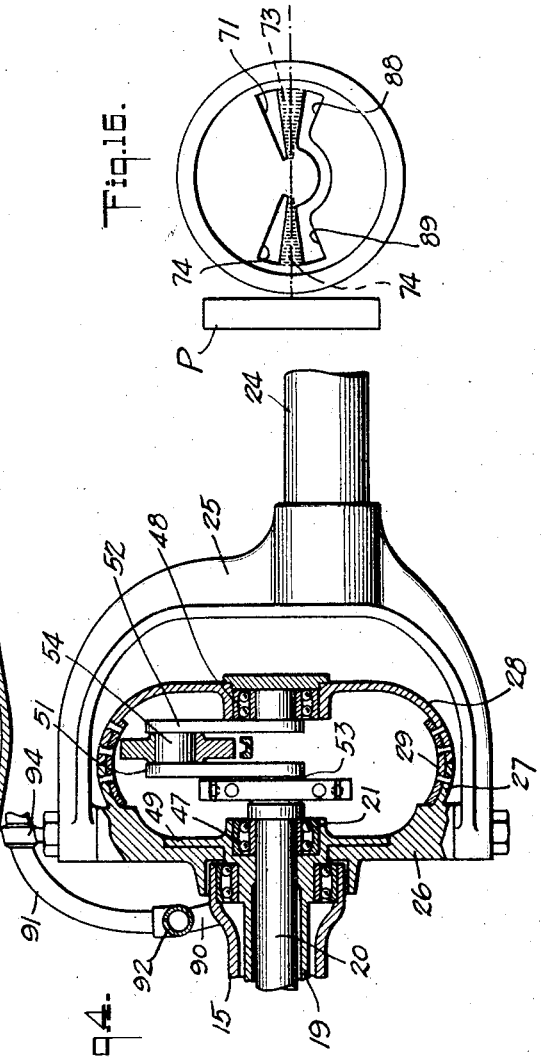
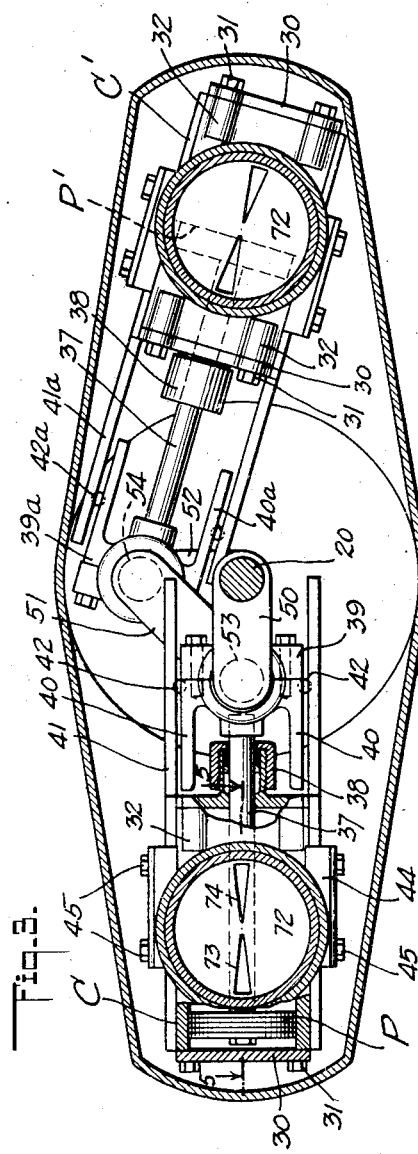
Inventor
JOHN J. LE DUC
By Munn & Co.
Attorney Oct. 18, 1927.
J. J. LE DUC
1,645,761
EXPANSIBLE FLUID MOTOR
Filed Aug. 16, 1924
5 Sheets-Sheet 3
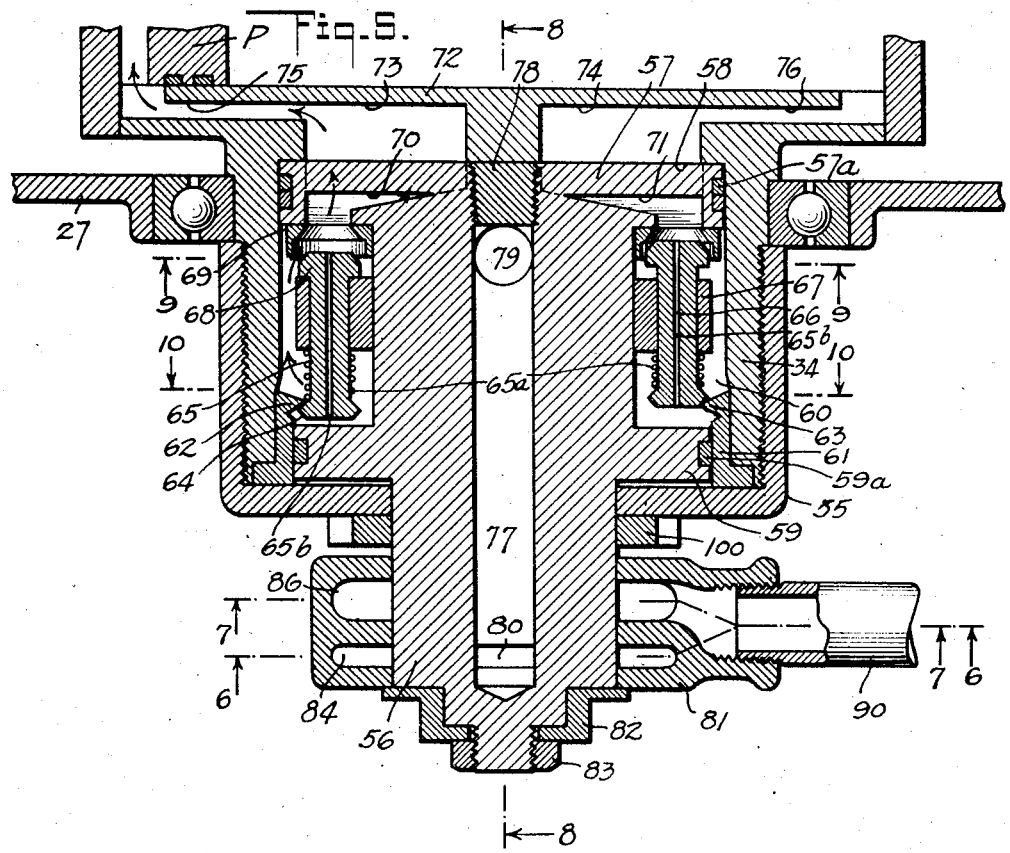
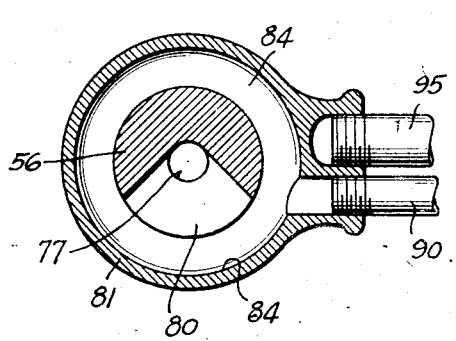
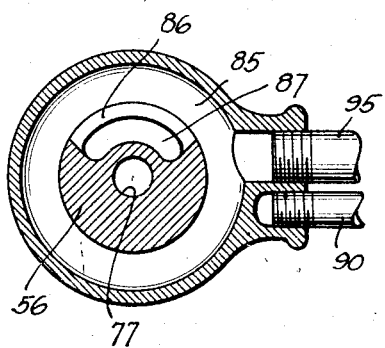
Inventor
JOHN J. LE DUC
By Munn & Co.
Attorneys

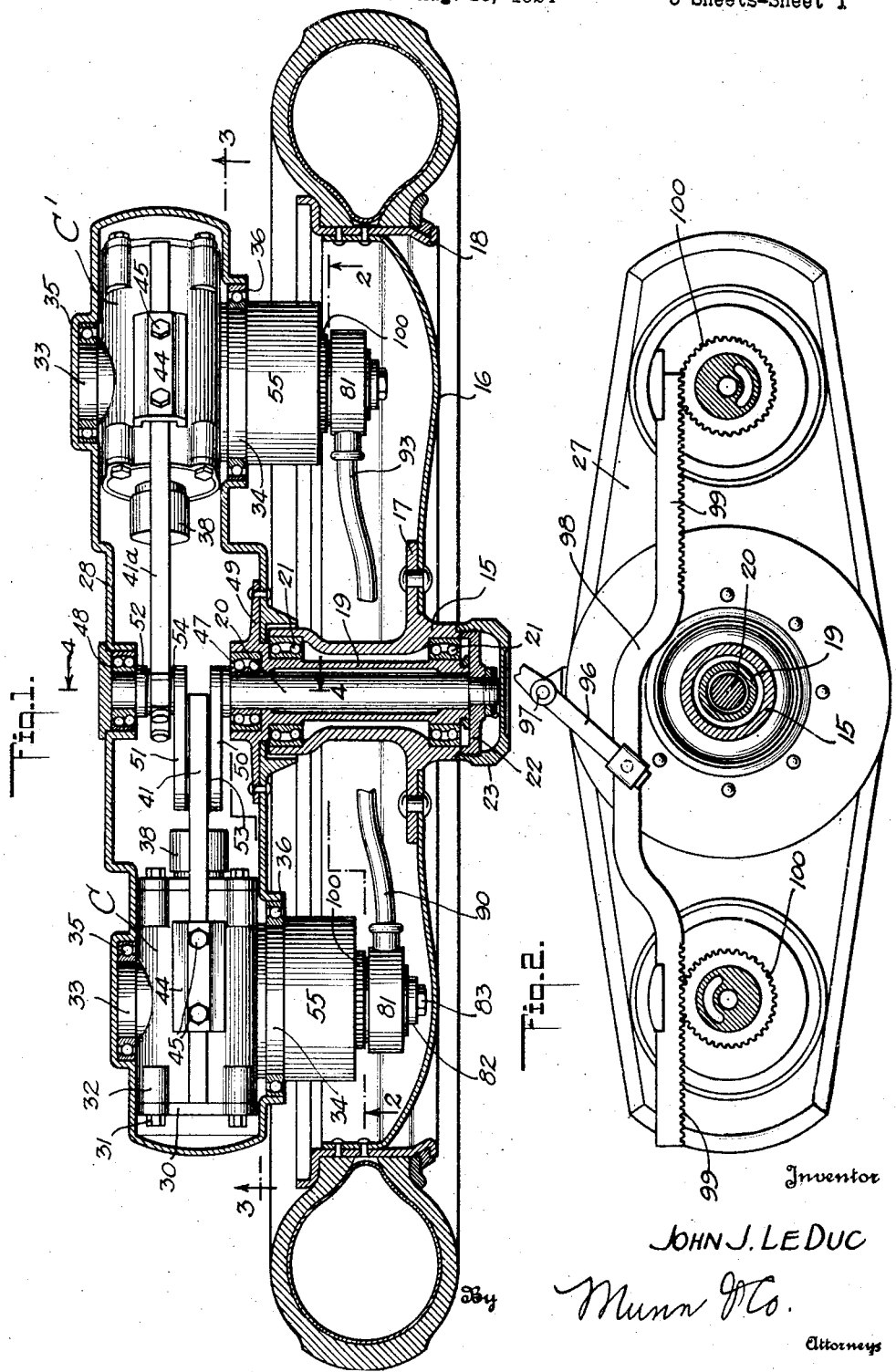

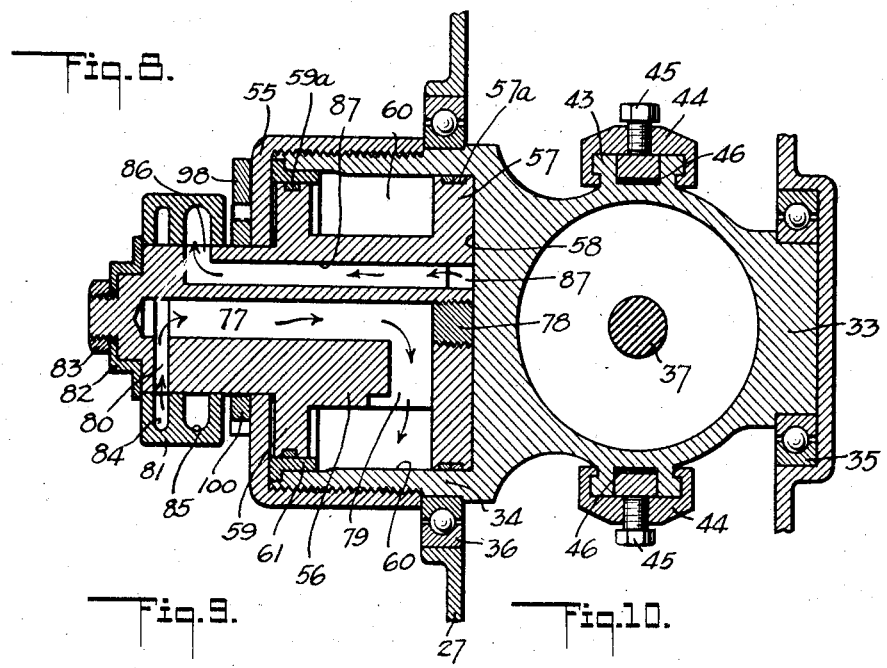
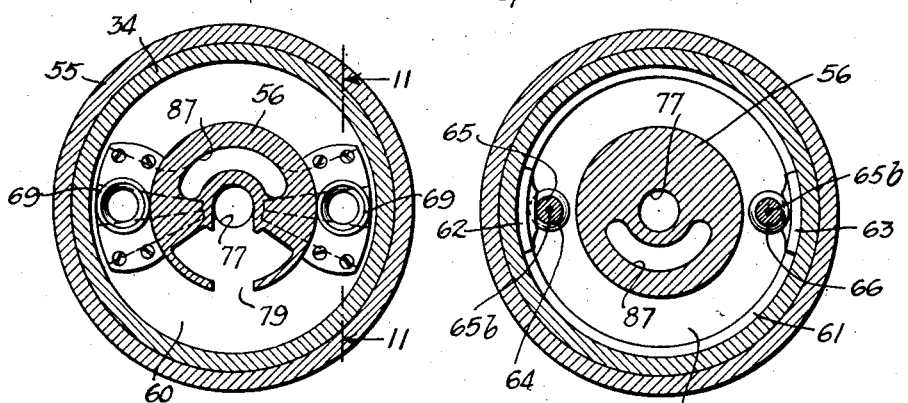
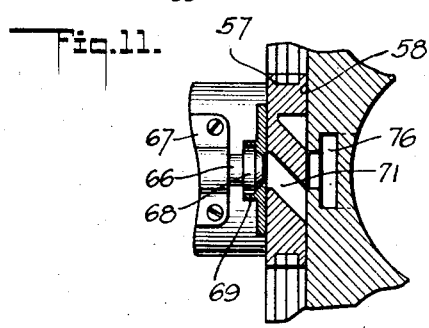

Oct. 18, 1927. 1,645,761
J. J. LE DUC
EXPANSIBLE FLUID MOTOR
Filed Aug. 16, 1924  5 Sheets-Sheet 5
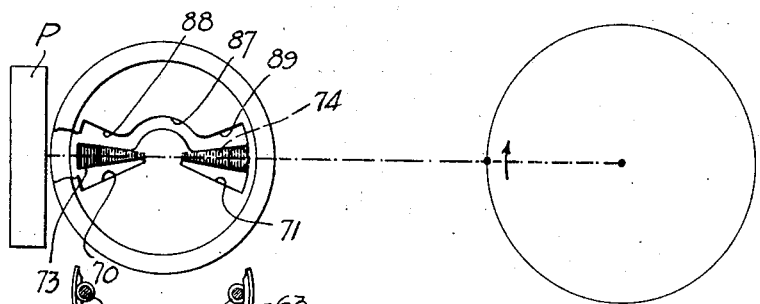
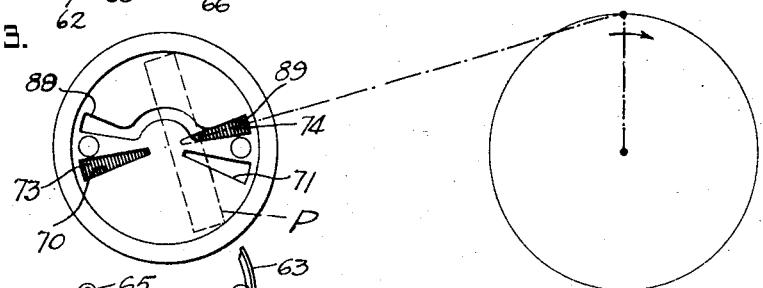
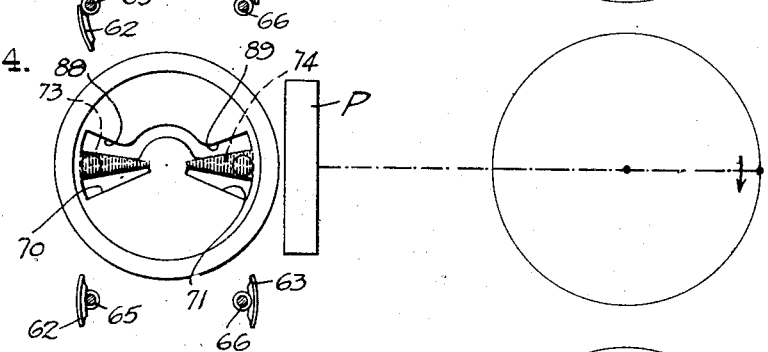
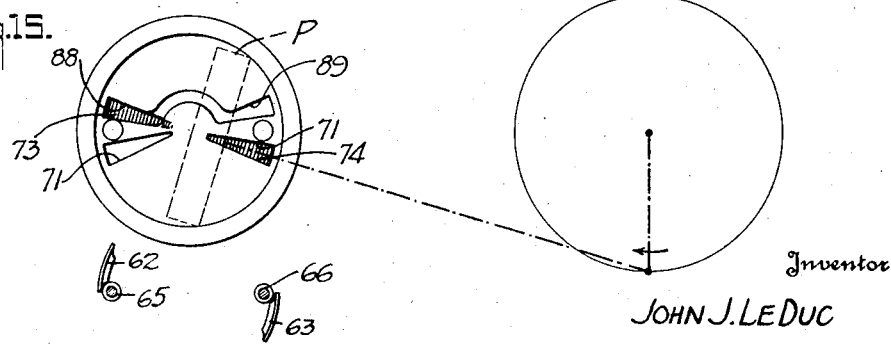
Inventor
JOHN J. LE DUC
By Munn & Co.
Attorneys Patented Oct. 18, 1927.

1,645,761

UNITED STATES PATENT OFFICE.

JOHN J. LE DUC, OF BURBANK, CALIFORNIA.

EXPANSIBLE-FLUID MOTOR.

Application filed August 16, 1924. Serial No. 732,473.

My invention relates to expansible fluid motors, and particularly to motors of the oscillating cylinder type.

It is a purpose of my invention to provide a compact and highly efficient expansible fluid motor which is particularly adapted, although not necessarily, for use as a propelling unit for a motor vehicle wheel, the motor being designed for direct association with the vehicle wheel so that, in practice, motors of this character may be applied to each of the wheels of the vehicle while employing a common source of expansible fluid supply.

It is also a purpose of my invention to provide a fluid motor of the oscillating type in which the expansible fluid is supplied to the cylinders so as to allow the full and complete expansible force thereof to be utilized, thereby greatly increasing the efficiency of the engine. This result is obtained by the use of cut-off valves which operate automatically to discontinue the admission of the main supply of expansible fluid to the cylinders when the reciprocating pistons have completed half of their stroke in either direction.

Another purpose of my invention is the provision of a valve mechanism for oscillating fluid motors in which bleed ports are associated with the cut-off valves above described which operate automatically after the cut-off valves have closed to continue a supply of fluid to the cylinders in greatly reduced quantities but in sufficient quantities to effect movement of the pistons beyond the half piston stroke for the purpose of overcoming dead points in the strokes of the pistons such as occur when the throttle has been closed and drifting or coasting of the vehicle has taken place prior to its stopping, and it is desired to again start the motor with the cut-off valves in closed position. Further, the bleed ports are of particular value when employing compressed air as the expansible fluid in connection with a low speed motor in that they allow a continued supply of compressed air to the cylinders after the main supply has been cut off, through continued supply, although being reduced in volume nevertheless provides sufficient additional power to insure the completion of the piston stroke, especially when starting and under heavy duty.

Another purpose of my invention is the provision of a fluid motor having incorporated therein a crank shaft of special design which permits the more intimate association of the cylinders of the motor with respect to each other and particularly with reference to their longitudinal alinement. Further, my invention includes valve mechanisms which are adjustable to supply the expansible fluid to the motor in such manner that the motor can be driven in either direction as desired.

I will describe only one form of expansible fluid motor embodying my invention, and will then point out the novel features thereof in claims.

In the accompanying drawings:

Figure 1 is a view showing in horizontal section one form of fluid motor embodying my invention in applied position with respect to the wheel of a vehicle;

Figures 2 and 3 are vertical sectional views taken on the lines 2—2 and 3—3, respectively, of Figure 1;

Figure 4 is a vertical sectional view taken on the line 4—4 of Figure 1;

Figure 5 is an enlarged horizontal sectional view taken on the line 5—5 of Figure 3;

Figures 6, 7, 8, 9 and 10 are vertical sectional views taken on the lines 6—6, 7—7, 8—8, 9—9 and 10—10, respectively, of Figure 5;

Figure 11 is a fragmentary sectional view taken on the line 11—11 of Figure 9;

Figures 12 to 15, inclusive, are views showing diagrammatically the several positions which the valve mechanism of the motor shown in the preceding views is adapted to occupy during one cycle of operation of the motor;

Figure 16 is a view similar to Figure 12, showing the reverse position of the valve mechanism for effecting a reversal of the motor.

Similar reference characters refer to similar parts in each of the several views of the drawings.

Referring specifically to the drawings, and particularly to Figures 1 to 4, inclusive, 15 designates the hub of a disk wheel, the disk body 16 being secured to a flange 17 on the hub and provided at its periphery with a rim 18 upon which is mounted a pneumatic tire. The hub 15 is designed to receive a spindle sleeve 19 through which extends a crank shaft 20, the spindle being rotatably supported in the hub by ball bearings 21, and the shaft 20 being operatively connected to the hub 15 through a conventional driving connection 22 normally covered by a cap 23. As shown in Figure 4, the vehicle wheel is mounted for steering on the vehicle axle 24 by a fork 25 and a steering knuckle 26, the knuckle being rotatably mounted in the fork to permit steering of the wheel, as will be understood. As shown in Figure 1, the motor includes a housing which completely encases the motor and, as shown in Figure 4, this housing extends through the fork 25 and is made up of two sections 27 and 28, the former of which is adapted to be cast integral with the knuckle 26 and the latter secured thereto by a connecting plate 29. The housing may be provided with suitable openings and cover plates therefor (not shown) to provide easy access to the motor.

Referring again to Figure 1, the motor housing is constructed to accommodate cylinders C and C′, each of which is provided with removable heads 30 connected to the body of the cylinder by bolts 31 which extend through bosses 32 cast integral with the cylinder. As the construction of each cylinder C or C′ and its associated parts is identical, a description of one will suffice for both. The cylinder C is provided at diametrically opposed points and medially of its length with trunnions 33 and 34 rotatable in bearings 35 and 36, respectively, whereby the cylinder is mounted for oscillatory movement within the housing, it being particularly noted that the housing is constructed to receive the bearings and trunnions.

Mounted for reciprocating movement within the cylinders C and C′ are pistons P and P′ having rods 37 fixed thereto and movable through stuffing boxes 38. The outer end of the rod 37 of the piston P is provided with a detachable cross head 39 having spaced arms 40 adapted to co-operate with guide bars 41 to slidably receive the cross head and to maintain the latter in proper alinement with the piston rod. To eliminate friction between the arms 40 and the guide bars 41, the confronting sides thereof are formed with raceways in which move ball bearings 42. The guide bars 41 are secured to grooved projections 43 cast integral with the cylinder as shown in Figure 8, and have tongue and groove connections with blocks 44 through which extend set screws 45 for engaging and securing the bars against movement on the cylinder. As shown in Figure 8, shims 46 are disposed beneath the bars 41 to allow for an inward lateral adjustment of the bars to take up wear of the balls and races 42 interposed between the arms 40 and the bars, it being understood that these shims are adapted to be removed by manipulation of the screws 45.

The cylinder C′ is provided with like guide bars 41ª, a cross head 39ª having arms 40ª, and ball bearings 42ª interposed between the arms and guide bars. The guide bars are adjustable upon the cylinder C′ in the same manner as the guide bars 41. The cross heads 39 and 39ª are operatively connected to the crank shaft 20, and, as shown in Figures 3 and 4, the crank shaft is rotatably mounted in bearings 47 and 48, the bearing 47 being mounted in a hub member 49 and the bearing 48 within the inner housing section 28. Between these bearings the crank shaft is formed with cranks 50, 51 and 52, and pins 53 and 54 connecting adjacent cranks. The cranks 50 and 52 are disposed at right angles to each other, and the crank 51 extends diagonally from the outer end of the crank 50 to the outer end of the crank 52. The cross head 39 is rotatable on the pin 53, and the cross head 39ª is rotatable on the pin 54, wherefore it will be seen that the connections of the pistons 37 with respect to the crank shaft 20 is such that they are spaced apart 90 degrees, and it is by means of this arrangement that it is possible to eliminate a dead center or stalling point in the cycle of the motor.

Referring now to Figures 5 to 11, inclusive, and particularly to Figure 5, I have shown the valve mechanism by which an expansible fluid, such as air or steam, is supplied to a cylinder C or C′ for effecting a reciprocating movement of the piston P or P′. As the valve mechanisms for the two cylinders are identical, a description of one will suffice for both. In Figure 5 the trunnion 34 is of a diameter exceeding that of the trunnion 33 and is of tubular form to accommodate the valve mechanism and to co-operate with a threaded cap 55 to provide a fluid chest to which the expansible fluid is supplied and discharged to the cylinder for actuating the piston. The cap 55 is provided with a central opening through which extends a valve body 56 having a valve head 57 abutting an annular shoulder 58 formed interiorly of the trunnion 34, and a second head 59 spaced from the first head so as to provide therebetween an annular chamber 60 in which the expansible fluid is adapted to be stored. The heads 57 and 59 carry leak-proof packing rings 57ª and 59ª, respectively, which serve to provide a fluid-tight joint between the heads and the ports with which they contact. A ring 61 surrounds the head 59, and the outer end of the trunnion 34 is designed to receive the ring in such manner that it may be firmly clamped between the trunnion and the cap 55. This ring carries abutments 62 and 63 which are of arcuate form as shown in Figure 10, and are disposed at diametrically opposed points to engage the beveled shoulders 64 of valves 65 and 66. The valves have rounded shanks rotatably mounted on brackets 67 which latter, as shown in Figure 11, are secured to the periphery of the valve body 56. These valves include heads 68 which are normally held off of seats 69 by springs 65ª embracing the shanks at points between the brackets 67 and the shoulders 64. As shown in Figure 9, the valve seats 69 are secured to the inner side of the valve head 57. These valves 65 and 66 including the heads 68 control the passage of the expansible fluid from the chamber 60 through inlet ports 70 and 71, respectively, formed in and extending diagonally through the valve head 57, as clearly illustrated in Figure 11. The passage of the fluid through the inlet ports 70 and 71 is controlled by a valve 72 formed integral with the cylinder C so as to oscillate therewith, the valve being provided with two ports 73 and 74 (Figure 5) which have communication with the respective ends of the cylinders through passages 75 and 76 so as to permit the supply of the expansive fluid to the opposite ends of the cylinder and to opposite sides of the piston P. In order to secure a maximum initial supply of the fluid to the cylinder, the ports 73 and 74 of the valve 72 and the inlet ports 70 and 71 increase in width from their inner ends to their outer ends, as illustrated in the diagrammatic Figures 12 to 15, inclusive.

The valve body 56, as shown in Figure 8, is constructed to provide an axial duct 77 closed at its inner end by a screw plug 78 and having a branch passage 79 at one end which provides communication between the passage and the chamber 60. The opposite end of the axial passage 77 is provided with a lateral passage 80 which, as shown in Figure 6, is substantially V-shaped so as to provide communication with a distributing and receiving head 81. This head 81 rotatably receives the outer end of the valve body 56 and is retained on the body by means of a cap 82 engaged by a nut 83. The member 81 is a casting formed to provide an annular passage 84 having communication at all times with the lateral passage 80, and with a second annular passage 85 which has communication at all times with a lateral passage 86 formed at one end of a longitudinal passage 87 formed in the valve body 56. This passage 87 is of arcuate form in cross section, as shown in Figure 9, and communicates at its opposite end with a pair of exhaust ports 88 and 89 (Figure 12) formed in the valve head 57 and adapted to have communication with the ports of the oscillating valve 72, as will be more fully described hereinafter.

The expansible fluid employed for operating the motor is adapted to be supplied to the distributing and receiving head 81 through a pipe 90 (Figures 1, 6 and 7), the pipe 90 being connected to a supply pipe 91 (Figure 4) through a T-connection 92, the latter being employed to also connect a second pipe 93 extending from the receiving and distributing head 81 of the other valve mechanism for the cylinder C'. The supply pipe 91 is supported upon a bracket 94 (Figure 4) and is adapted to extend to a suitable source of expansible fluid supply (not shown) which is adapted to be carried by the vehicle. The pipe 90 has communication with the circular passage 84, as clearly shown in Figure 6, so that fluid can be supplied to the passage 77 and from the latter through the passage 79 into the chamber 60. Communicating with the annular passage 85 is an exhaust pipe 95 which may extend to any point suitable to permit the exhaust of the fluid after the same has performed its work in the motor.

Referring now to Figure 2 I have here shown one form of manually operable means for actuating the valve bodies 57 of the two valve mechanisms to effect a reversal in operation of the motor so that the crank shaft 20 and consequently the vehicle wheel can be rotated in either direction as desired. This means comprises, in the present instance, a lever 96 fulcrumed at a point indicated at 97, and having operative connection with a bar 98 provided with racks 99 constantly meshing with gears 100 fixed to the valve bodies so that when the bar is moved longitudinally through actuation of the lever the valve bodies can be rotated to occupy one extreme position in which the inlet ports 70 and 71 are positioned to admit fluid to the ends of the cylinder in such order that the crank shaft is rotated in one direction and another extreme position in which the same inlet valves are reversed in their position so that the order of admitting fluid to the ends of the cylinder will effect rotation of the crank shaft in the opposite direction. It is to be particularly noted that the adjustment of the valve bodies 57 does not interfere with the co-operation of the several passages in the bodies and head 81 in supplying the expansible fluid to the chambers 60 or the exhaust of the fluid from the cylinders.

The operation of the motor is as follows:

In practice, the provision of the housing allows the motor to operate in oil so as to properly and thoroughly lubricate the moving parts thereof. With the inlet pipes 90 placed in communication with a source of expansible fluid supply, and the control lever 96 in the extreme position shown in Figure 2, in which position each of the valve bodies 56 occupy the position indicated diagrammatically in Figure 12, fluid will be supplied to each chamber 60 of the fluid chests as follows: from the discharge end of the pipe 90 (Figure 6) through the annular passage 84 of the head 81, into the longitudinal passage 77 through the lateral passage 80, and from the passage 77 through the lateral passage 79 into the chamber 60. The chamber 60 is of an area to permit the storing of a sufficient supply of fluid to fill the cylinder C or C' as soon as the oscillating valve 72 is moved to allow the admission of the fluid to the cylinder, thus maintaining an even flow of fluid. With the chamber 60 filled with the expansible fluid, it will be clear that the heads 57 and 59 provide surfaces against which the expansible fluid acts to balance the valve body, but because of the increased diameter of the valve head 57 with respect to the head 59, the pressure of the fluid will urge the valve body in the direction of the cylinder sufficiently to provide a leak-proof joint between the oscillating valve 72 and the valve head 57. However, the urging action of the fluid is insufficient to offset any binding action between the oscillating valve and the valve head so that rotation of the valve body when desiring to reverse the engine can be effected with ease and under full pressure. This is a very desirable feature, especially for automobile use, where safety depends so much upon the mechanical parts working freely and accurately.

With the valve body in the normal position shown in Figure 12 the ports 73 and 74 are out of registration with the inlet ports 70 and 71, and the piston P is in the left hand extreme position as illustrated diagrammatically in Figure 12. The abutments 62 and 63 are now in the positions shown in Figure 12, wherein they abut the shoulders 64 of the valves 65 and 66, as clearly illustrated in Figure 5, so that the valve 65 is held in fully open position to allow the passage of fluid to the inlet port 70. Now upon oscillation of the valve 72, the port 73 moves into registration with the inlet port 70 so that fluid is supplied to the left hand end of the cylinder C through the passage 75 to act upon the piston P and thus actuate the crank shaft 20. To initiate movement of the valve 72 the cylinder C is oscillated by the crank shaft 20 through movement of the piston P' for the cylinder C', it being remembered that the 90 degree spacing of the cranks 50 and 52 causes the pistons to act one in advance of the other and in such sequence that the fluid is supplied to one cylinder when the other is on dead center. When the oscillating valve 72 is in closed position the crank 50 for the piston P is on left hand dead center, and as the crank moves toward the 90 degree position the valve 72 begins to open, and is fully opened when the crank reaches the 90 degree position. In the fully open position of the valve 72 the inlet port 70 is completely uncovered by the port 73, while the port 74 uncovers the exhaust port 89 so that the expanded fluid upon the opposite side of the piston is permitted to exhaust from the cylinder through the passages 87, 86 and 85 to the exhaust pipe 95. During the movement of the crank to the 90 degree position the abutments 62 and 63 are moved to disengage the shoulders 64 of the valves 65 and 66 as illustrated in Figure 13, so that the valve 65 is free to respond to the sucking action of the fluid discharged through the inlet port 70, which action operates to close the valve on its seat and against the action of the corresponding spring 65ª. With the valve 65 closed the main supply of the fluid to the cylinder is discontinued, and the initial supply is allowed to fully expand in the cylinder in acting upon the piston P. The valve 65 remains closed during the movement of the crank from the 90 degree position to the 180 degree position shown in Figure 14, and during this movement of the crank the valve 72 is rotated to a position in which the inlet port 70 and the exhaust port 89 are completely closed. It is to be noted, however, that after the inlet port 70 is closed the spring 65ª operates to open the valve 65, the pressure of the fluid on the opposite sides of the valve having been equalized by the admission of the fluid to the inlet port through a duct 65ᵇ formed in the shank of the valve as shown in Figure 5. However, the valve 65 does not move to fully open position because of the position of the abutments 62, the latter now occupying a position directly in the path of movement of the valve so that as the latter is retracted to open position the shoulder 64 strikes the inner side of the abutment, as has been illustrated in connection with the valve 66 in Figure 5. This position of the valve 65 is maintained during the entire movement of the crank from the 90 degree position to the 180 degree position. During this movement of the crank the valve 66 which is disengaged by the abutment 63 when the crank is in the 90 degree position, as shown in Figure 13, is moved to fully open position by the spring 66ª so that as the abutment 63 oscillates it will engage the shoulder 64 so as to hold the valve in completely open position. With the valve 66 in open position it will be clear that as the crank moves from the 180 degree position to the 270 degree position the movement of the oscillating valve 72 will open the inlet port 71 and allow the passage of fluid from the chamber 60 into the passage 76 and from the latter into the opposite end of the cylinder C to act upon the opposite side of the piston P. When the crank reaches the 270 degree position the abutment 63 disengages the valve 66 and under the action of the fluid the valve is closed, thus preventing the further discharge of fluid through the port 71 and allowing the initial supply of fluid to the cylinder to fully expand in acting upon the piston to move the latter in the opposite direction. With the opening of the port 71 the exhaust port 88 is opened to place the passage 75 in communication with the exhaust passage 87 of the valve body 56 so that the fluid which was supplied to the left hand side of the piston P and expanded can now exhaust from the cylinder.

When the crank reaches the 360 degree position, or the position shown in Figure 12, the oscillating valve 74 has been returned to normal position, thus completing the cycle.

During this cycle of operation it is to be particularly noted that when the first cut-off valve 65 is closed and the inlet port 70 is open, the bleed port 65$^b$ still permits fluid to be supplied to the cylinder C but in a reduced quantity owing to the size of the port and so long as the inlet port 70 remains open or until the crank reaches the 180 degree position. The additional power afforded by this reduced quantity of fluid is utilized for two important purposes. First, to overcome dead points in the strokes of the piston which occur when the throttle has been closed to cut off further supply of fluid to the fluid chest as when the vehicle is drifting or coasting prior to a stopping and it is desired to again start the motor when the cut-off valve is in closed position and fluid prevented from entering the cylinder past the cut-off valve. Second, when employing compressed air as the expansible or propelling medium, a fluid which does not possess the attenuated expansion curve as does steam, and in connection with a low speed motor it is necessary, especially when starting and when performing heavy duty, that a prolonged supply of air to the cylinder be effected in order to insure the completion of the piston stroke in every instance. By means of the bleed ports this prolonged supply is effected, and although reduced in volume is nevertheless sufficient to accomplish the results intended.

In order to effect a reversal of the motor it is only necessary to move the lever 96 from the left hand extreme position shown in Figure 2 to the right hand extreme position, whereby the valve bodies 56 are rotated 180 degrees to cause the inlet ports 70 and 71 and the exhaust ports 88 and 89 to occupy reverse positions with respect to the ports of the oscillating valve 72, as clearly illustrated in Figure 16. With the valve bodies in this reverse position it will be manifest that the initial movements of the piston will be such as to rotate the crank shaft in opposite directions.

From the foregoing operation it will be manifest that during either stroke of the piston P or P', the supply of expansible fluid to the cylinder, although initiated by the oscillation of the valve 72, is cut off before the piston reaches the end of its stroke so as to allow the full and complete expansion of the fluid whereby the efficiency of the motor is greatly increased. In the present design the cut-off occurs after the piston has completed one-half of its stroke, but it is to be understood that the valve mechanism may be designed to vary the instant at which the cut-off occurs with respect to the stroke of the piston.

Although I have herein shown and described only one form of expansible fluid motor embodying my invention, it is to be understood that various changes and modifications may be made herein without departing from the spirit of the invention and the spirit and scope of the appended claims.

I claim:

1. An expansible fluid motor comprising a cylinder mounted for oscillation and having a pair of ports, a piston in the cylinder, a valve body having intake ports and exhaust ports, said cylinder ports alternately registering with the intake and exhaust ports when the cylinder is oscillated so that an expansible fluid will be supplied to first one side of the piston and then the other and exhausted from the opposite side and then the other, whereby reciprocating movement of the piston is effected, valves controlling the intake ports and normally urged to occupy an open position, and abutments mounted to oscillate with the cylinder and engageable with the last mentioned valves to retain the latter in open position for a predetermined period against the action of the fluid entering the cylinder.

2. An expansible fluid motor comprising a cylinder mounted for oscillation and having a pair of ports, a piston in the cylinder, a fluid chest for supplying expansible fluid to the cylinder, a valve body in the fluid chest, inlet ports in the valve body co-operating with the cylinder ports to supply the expansible fluid from said chest to the cylinder in such manner that a reciprocation of the piston is effected, inlet valves controlling the inlet ports and constructed to close the inlet ports when the latter are placed in communication with the cylinder, yieldable means for moving the valves to open the inlet ports when the latter are not in communication with the cylinder, abutments oscillated by the cylinder for maintaining the inlet valves open for a predetermined period when the inlet ports are in communication with the cylinder, and ducts and ports in the valve body co-operating with the cylinder ports to permit exhaust of the expansible fluid from the cylinder.

3. An expansible fluid motor as embodied in claim 2, wherein a crank shaft is connected to the piston and the valve body is movable in the fluid chest to occupy two extreme positions in which the expansible fluid is supplied to and exhausted from the cylinder to cause rotation of the crank shaft in one direction or the other according as the valve body occupies one extreme position or the other.

4. An expansible fluid motor as embodied in claim 2 wherein a pair of heads are formed on the valve body, said heads being of different diameters and disposed within the fluid chest so as to be subjected to the action of the expansible fluid in the manner and for the purpose described.

5. An expansible fluid motor as embodied in claim 2 wherein the inlet valves are adapted to be closed by the fluid flowing through the inlet ports, and ducts in the inlet valves to permit an equalization of fluid pressure at opposite sides of the valves when the inlet ports are closed whereby the yieldable means act to open the valves.

6. An expansible fluid motor comprising a cylinder mounted for oscillation and having a pair of ports, a piston in the cylinder, a fluid chest for supplying expansible fluid to the cylinder, a valve body in the fluid chest, inlet ports in the valve body co-operating with the cylinder ports to supply the expansible fluid from said chest to the cylinder in such manner that a reciprocation of the piston is effected, inlet valves controlling the inlet ports and constructed to close the inlet ports when the latter are placed in communication with the cylinder, yieldable means for moving the valves to open the inlet ports when the latter are not in communication with the cylinder, abutments oscillated by the cylinder for maintaining the inlet valves open for a predetermined period when the inlet ports are in communication with the cylinder, ducts and ports in the valve body co-operating with the cylinder ports to permit exhaust of the expansible fluid from the cylinder, a crankshaft connected to the piston and the valve body and movable in the fluid chest to occupy two extreme positions in which the expansible fluid is supplied to and exhausted from the cylinder to cause rotation of the crankshaft in one direction or the other according as the valve body occupies one extreme position or the other, and a fluid distributing and receiving member movably receiving the valve body so that fluid can be supplied to and exhausted from the valve body irrespective of its position.

7. In a motor of the character described, a pair of cylinders mounted for oscillatory movement, pistons reciprocable in the cylinders, rods rigidly connected to the piston, crossheads fixed to the rod, a crankshaft having a pair of crank arms pivotally connected to the cross heads, guide arms mounted on the cylinders and having rolling contact with the cross heads, said guide arms being adjustable on the cylinders by means of projections which receive the arms, blocks slidable on the projections, and means carried by the blocks and engaging the arms for securing the arms and blocks against movement.

8. An expansible fluid motor comprising a cylinder mounted for oscillation and having a pair of ports, a piston in the cylinder, a valve body having intake ports and exhaust ports, said cylinder ports alternately registering with the intake and exhaust ports when the cylinder is oscillated so that an expansible fluid will be supplied to first one side of the piston and then the other and exhausted from the opposite side and then the other, whereby reciprocating movement of the piston is effected, valves controlling the intake ports, said valves normally urged to occupy an open position and movable to a closed position by the action of fluid entering the cylinder when the cylinder and body ports are in registration, and means for maintaining the valves in their open position for a predetermined period against the action of the fluid.

9. An expansible fluid motor as embodied in claim 8 wherein the valves are provided with ducts through which fluid is admitted to the intake ports to thereby equalize the pressure of the fluid upon opposite sides of the valves when the latter are closed and the cylinder and body ports are out of registration, whereby the valves are free to move to their open position.

JOHN J. LE DUC.